UNITED STATES PATENT OFFICE.

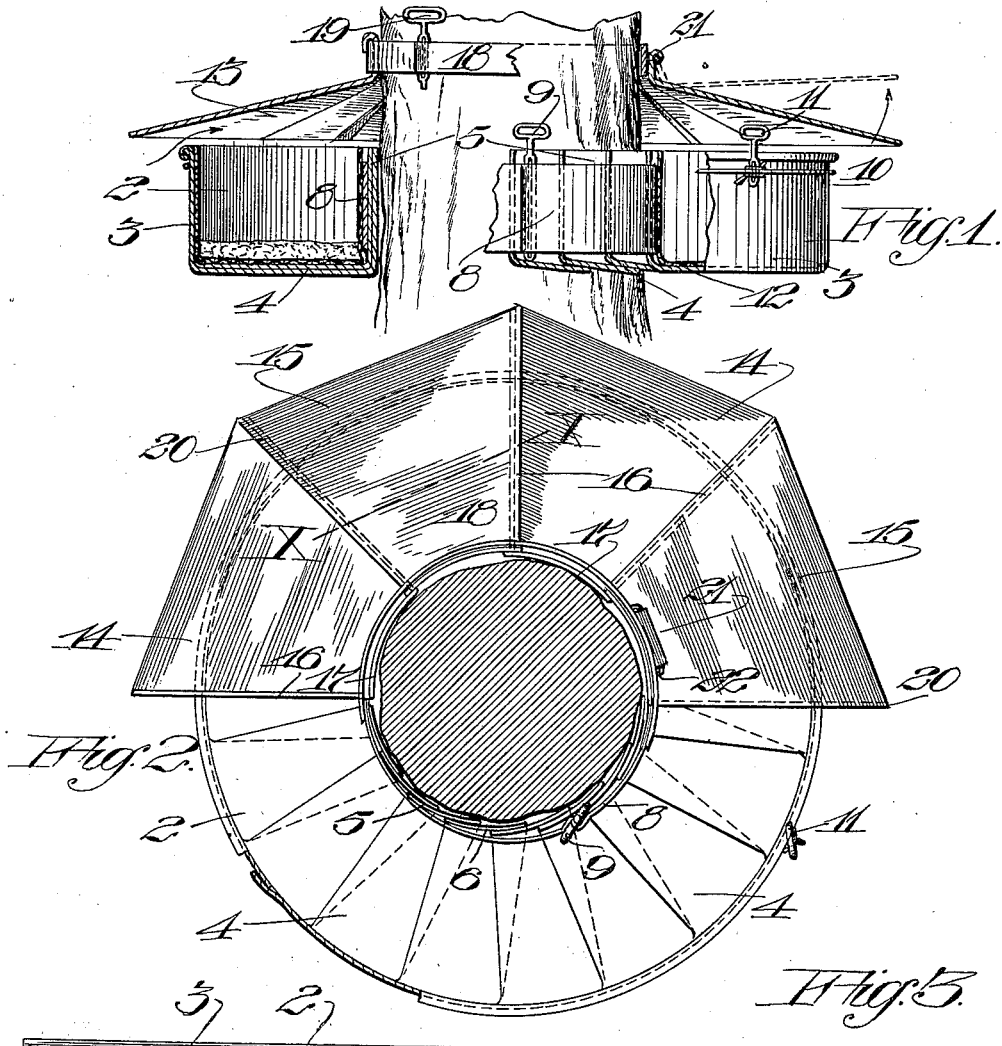

CHARLES A. HUFFMASTER, OF SAN LEANDRO, CALIFORNIA.

INSECT-GUARD FOR TREES.

1,043,431.　　　　　　Specification of Letters Patent.　　　Patented Nov. 5, 1912.

Application filed October 10, 1911.　Serial No. 653,783.

*To all whom it may concern:*

Be it known that I, CHARLES A. HUFFMASTER, citizen of the United States, residing at San Leandro, in the county of Alameda and State of California, have invented new and useful Improvements in Insect-Guards for Trees, of which the following is a specification.

This invention relates to an appliance for the trapping and destruction of insects.

The object of this invention is to provide an insect trap of inexpensive material and construction, capable of being readily adjustable to trees or the like, of different sizes; which is demountable, and can be closely packed for shipment and storage.

The invention consists of the parts and the combination and construction of parts as hereinafter more fully described and claimed, having reference to the accompanying drawings, in which—

Figure 1 is a sectional elevation. Fig. 2 is a sectional plan. Fig. 3 shows the unfolded blank for the collar. Fig. 4 is a section on line X—X of Fig. 2.

The illustrated embodiment of my invention comprises a trough-like collar 2 having its free ends slipped or telescoped together thus permitting its adjustment around one or another of trees of different circumference.

The outer flange 3 of the collar is imperforate, or uncut while the bottom 4 and the central girdle 5 are formed by overlapping, separated tongues 6 formed by slitting a sheet as shown at 7 in Fig. 3. Thus the trough is arranged by bending the blank to make a ring after which the tongues 6 are bent inwardly at a suitable angle to form the bottom 4. Then the inner portions of the tongues are bent upward at such a distance from the outer ring as will afford the substantially continuous, snugly fitting girdle 5.

The collar or trough 2 is held in position partly by an annular band 8, of appropriate width, the ends of which are connected to a winding device or key 9 by which it is drawn tightly upon the several tongues 6.

The outer flange of the collar is surrounded by a wire or other device 10, which is tightened by a key 11 thus restraining the telescoped ends in annular relation.

When the trough 2 has been properly adjusted, the crevices at the edges of the tongues may be closed with a suitable cement, or if desired a removable fabric or other pliable lining 12 may be arranged in the trough.

Any effective insecticide may be placed within the trough and any insects entering will be destroyed.

For the purpose of preventing the trough from being clogged up with falling leaves, twigs and fly debris, I provide an adjustable cover or hood 13 formed of a number of wedge-shaped sections 14 and 15. Certain of the sections or plates as 14 have upturned edges and end flanges 16—17; the latter being adapted to slip beneath a strap or binding device 18 tightened by a key 19. Overlying the upturned flanges 16 of the plates 14 are alternate, similarly shaped sections 15 having down-turned flanges 20 and also having hinge-forming beads 21 adapted to fit small wire loops 22, which project through the strap 18.

By providing a number of conveniently sized, complementary, hood-forming sections these may be radially adjusted about a tree body and effectively protect the trough beneath.

The device or trap as described, made of sheet-metal and wire, is thus inexpensive, easily bent to best fit a tree or the like, and can be dismantled and used repeatedly by loosening up the several keys.

Having thus described my invention, what I claim and desire to secure by Letters Patent is—

1. The combination in an insect trap, of an annular, adjustable trough, means for securing the trough in adjusted position, and a protecting hood of greater diameter than and covering the trough, said hood being formed of sections with alternate sections having flanged edges overlying the corresponding edges of intermediate sections.

2. The combination in an insect trap, of an annular, adjustable trough, means for securing the trough in adjusted position, and a protecting hood of greater diameter than and covering the trough, said hood being formed of sections with alternate sections having flanged edges overlying the corresponding edges of intermediate sections, certain of said sections having bent inner ends embracing the tree trunk, and means engaging said ends for binding them to the tree trunk.

3. The combination in an insect trap, of an annular, adjustable trough, means for securing the trough in adjusted position, and a protecting hood of greater diameter than and covering the trough, said hood being formed of sections with alternate sections having flanged edges overlying the corresponding edges of intermediate sections, certain of said sections having bent inner ends embracing the tree trunk, and certain of the sections being hinged, and a means engaging said ends for binding them to the tree trunk.

In testimony whereof I have hereunto set my hand in the presence of two subscribing witnesses.

CHARLES A. HUFFMASTER.

Witnesses:
 HARRIS P. JONES,
 RAYMOND D. JONES.

Copies of this patent may be obtained for five cents each, by addressing the "Commissioner of Patents, Washington, D. C."